United States Patent [19]

McSweeney

[11] Patent Number: 4,508,740

[45] Date of Patent: Apr. 2, 1985

[54] TABLETTED BEVERAGE COMPOSITION CONTAINING DIPEPTIDE SWEETENER AND PROCESS THEREFORE

[75] Inventor: Daniel R. McSweeney, Plainsboro, N.J.

[73] Assignee: General Foods Corporation, White Plains, N.Y.

[21] Appl. No.: 512,805

[22] Filed: Jul. 11, 1983

[51] Int. Cl.³ .................... B27J 5/00; A23L 2/00; A23L 1/275; A23L 1/236

[52] U.S. Cl. .................... 426/250; 426/285; 426/454; 426/548; 426/590; 264/124

[58] Field of Search ............... 426/590, 285, 453, 601, 426/548, 591, 442, 454, 465, 661, 250, 511, 650; 264/232, 124

[56] References Cited

U.S. PATENT DOCUMENTS

| | | | |
|---|---|---|---|
| 2,380,092 | 7/1945 | Weisberg | 426/454 |
| 2,851,361 | 9/1958 | Diller | 426/591 |
| 2,889,226 | 6/1959 | Hinkley | 426/548 |
| 3,627,583 | 12/1971 | Troy et al. | 426/285 |
| 3,653,914 | 4/1972 | Schmitt | 426/302 |
| 3,660,107 | 5/1972 | Mayer | 426/591 |
| 3,667,962 | 6/1972 | Fritzberg et al. | 426/591 |
| 4,004,036 | 1/1977 | Schmitt | 426/285 |
| 4,009,292 | 2/1977 | Finucane | 426/548 |
| 4,013,775 | 3/1977 | Nelson et al. | 426/285 |
| 4,031,238 | 6/1977 | Reid et al. | 426/285 |
| 4,384,005 | 5/1983 | McSweeney | 426/250 |
| 4,412,984 | 11/1983 | van der Loo et al. | 426/650 |
| 4,414,198 | 11/1983 | Michaelson | 426/591 |

Primary Examiner—Robert Yoncoskie
Assistant Examiner—Elizabeth C. Weimar
Attorney, Agent, or Firm—Thomas R. Savoie; Thomas A. Marcoux; Daniel J. Donovan

[57] ABSTRACT

The present invention provides improved beverage mix tablets and an improved process for preparing them. According to the improved process, a dipeptide sweetener, acidulent, colorant and hydrophilic material are blended to form a dry mix with which an aqueous moistener comprising glycerine and monocalcium phosphate is admixed to form a cohesive powder. The moistened cohesive powder is then mixed with a disintegrant to form a tabletable mixture which can be suitably compressed to form a coherent tablet which has a tablet density, after drying, of about 0.5 to 1.0 grams per cubic centimeter. The resulting tablet is tough, void-free, nonfriable and rapidly soluble in water.

9 Claims, No Drawings

TABLETTED BEVERAGE COMPOSITION CONTAINING DIPEPTIDE SWEETENER AND PROCESS THEREFORE

TECHNICAL FIELD

This invention relates to a tabletted comestible mix sweetened with dipeptides, and more particularly to a tabletted form of said beverage mix wherein a monocalcium phosphate comprises a necessary constituent and a process for producing it.

Dry beverage mixes enjoy wide commercial use because they offer convenience, economy, and good taste. These compositions are currently available in both pre-sweetened and unsweetened forms and are typically packaged as powders. Dipeptide-sweetened (L-aspartyl-L-phenylalanine methyl ester, aspartame) beverage mixes are of particular interest to persons seeking to avoid certain high-calorie or synthetic sweeteners for medical reasons or for simple dietary reasons. Dry beverage compositions in powder form can be packaged in sizes convenient for preparing a single serving or a particular-sized container of the beverage. Powders tend to be difficult to control and it would be desirable to have a unitary form which prevents spillage of material while maintaining ease of preparation.

There have been prior attempts to prepare dry beverage compositions in the form of tablets; however, these tablets are typically either poorly soluble in cold water or lack the proper structural strength to maintain the integrity during normal conditions of shipping and handling. Therefore, it would be desirable to have a unitary dry beverage composition in the form of a rapidly-soluble, yet structurally-strong tablet.

BACKGROUND ART

The prior art has provided a number of procedures for preparing dry beverage tablets. In U.S. Pat. No. 2,889,226 to Hinkley and U.S. Pat. No. 3,660,107 to Mayer, effervescent couples are added to tabletted dry beverage mixes to improve the rate of solubility of the highly compressed tablets. Hinkley employs a wetting agent in addition to the effervescent materials.

While not directly related to the preparation of beverage tablets, U.S. Pat. Nos. 3,653,914 and 4,004,036 to Schmitt describe the preparation of rapidly-soluble sweetener tablets for use in hot or aqueous media. In preparing the tablets, a minor amount of water is added with an organic solvent to release a portion of the $CO_2$ from an effervescent couple which is employed to aid in dissolving the tablet. The release of $CO_2$ during molding is said to achieve a porous structure. U.S. Pat. No. 4,004,036 indicates that the tablet is weaker than would be desired but can be strengthened by contacting the formed tablet with an organic solvent.

In U.S. Pat. No. 2,851,361 to Diller, there is disclosed a tablet for preparing a carbonated soft drink in cold water. It is indicated that the density of the tablet is a critical factor and should be about 1.3 grams per cubic centimeter. The patent discloses that because it is difficult to secure the desired high density, the tablet can be compressed while removing entrapped air. The patent further suggests that a lubricated die using a pressure of about 4,000 pounds per square inch, psig (281.2 kilograms per square centimeter, $Kg/Cm^2$) is appropriate.

U.S. Pat. No. 3,667,962 to Fritzberg et al, indicates that the solubility of tablets for preparing carbonated beverages can be improved by forming separate acid and carbonate portions which are both highly porous and friable. In the paragraph bridging columns 3 and 4 of this patent, it is indicated that these puffed materials can be crushed to packaging powdered form. Thus, while Fritzberg et al disclose a way to improve solubility, they do so without concern for structural strength of the formed product.

In U.S. Pat. No. 4,031,238 to Reid et al, there is disclosed a water-soluble, solid beverage cube consisting of powdered glucose monohydrate, sucrose and a hygroscopic flavor material. According to the disclosure, this mixture is heated in a closed or moistened environment and then shaped to final form. This is said to be an improvement upon the disclosed prior art procedure of combining a flavor material with a vehicle such as ethyl alcohol and water to form a damp, non-cohesive powder which is then formed into a cube under pressure and dried to evaporate the vehicle.

Hence, there remains a present need for a dipeptide-sweetened, unitary dry beverage composition in the form of a soluble, yet structurally-strong tablet, and a process for preparing such a product.

DISCLOSURE OF INVENTION

In accordance with the present invention, there is provided an improved process for preparing a dipeptide-sweetened tabletted beverage mix. The preparation thereof, consists of a two-step process. First, a "moistener-composition" is prepared; the "moistener-composition" being composed of monocalcium phosphate and the liquid ingredients specified hereinbelow. The "moistener-composition" is then added to the dry-particulate ingredients which include a dipeptide sweetener, an acidulent, a colorant and other carriers of bulking agents. One admixes the "moistener-composition" containing monocalcium phosphate with the dry-particulate portion thereby forming a cohesive powder and a tabletable mixture. Finally, the cohesive or tabletable mixture is compressed under low pressure to form a tablet. The tablet should possess a density, after drying, of from 0.5 to 1.0 grams per cubic centimeter; and thereafter, drying the tablet to a stable moisture content of less than 1% by weight.

This process is capable of forming a dipeptide-sweetened beverage mix and further improvements according to the present invention relate to narrower aspects for forming this product. The product of this process is also claimed and is clearly improved in terms of an overall desirable balance in the toughnes, structural integrity, and solubility of the product.

BEST MODE FOR CARRYING OUT THE INVENTION

The beverage mix to be tabletted according to the present invention will necessarily comprise colorant, flavor, monocalcium phosphate and edible acidulent in the amounts effective to provide the desired taste and eye appeal. The beverage mix also contains a dipeptide sweetener such as the lower alkyl esters of aspartyl phenylalanine and their edible salts.

In its broad aspects, the process for preparing this dry beverage composition will comprise blending at least a portion of the dipeptide sweetener with the acidulent colorant and then all in dry particulate form, to form a uniform dry mix. The dry mix may also, but preferably does not, contain the flavorant. The resulting dry mix is then admixed with an aqueous moistener consisting of monocalcium phosphate, water, a lower alkyl glycol or alcohol and glycerine to form a moistened, cohesive powder. About 15% to 50% of the weight of the finished tablet will be comprised of monocalcium phosphate.

Flavorant and other ingredients, such as a disintegrant, suitable for the formation of a tabletable mixture may be uniformly dispersed throughout the moistened powder. The resulting tabletable mixture is compressed and dried.

As a colorant, there can be employed any of those materials which are typically employed in dry beverage mixes. The color is present in an amount effective to simulate the color normally associated with the particular flavor system employed. Thus, for example, where a root beer or cola flavor is employed, a colorant such as caramel which is capable of providing a brown coloration to the liquid will be employed. Similarly, where an orange, lemon or lime flavor is desired, the color will be selected from those capable of providing an orange, yellow, or green coloration respectively.

It is generally preferred that the beverage contains a sufficient amount of an acidulent to provide a final beverage pH of between about 2.5 and about 5.5, preferably from about 2.5 to about 5.0. The acidulent can comprise any edible acid capable of packaging in dry form. Among these are citric, malic, fumaric, adipic, and the like. These can be employed alone or in combination with a suitable buffer such as sodium or potassium citrate, malate or fumarate. While the level of acid will be largely a matter of taste, it will typically be present in an amount of from about 1 to 6 grams for each amount of mix for preparing 1 quart of beverage. It is also typical to employ ascorbic acid, mono-, di-, or tri-calcium orthophosphates for their beneficial effects upon powder handling, taste and nutrition.

The flavorant, like the colorant, is essential to the preparation of the beverage composition, but is employed in forms and amounts as are determined by organoleptic responses. Typical of the flavors employed are cola, root beer, orange, cherry, raspberry, lemon-lime, black cherry, lemonade, watermelon, grapefruit, grape and the like. Where flavors containing oxidizable oils or other sensitive components are employed, it is desirable to suitably protect these components by encapsulation by known techniques, such as in the form of extruded flavors such as those sold under the tradmark Durarome commercially available from Mutual Citrus Products.

The dipeptide sweeteners, which can be employed are dipeptides and their salts such as L-aspartyl-L-phenyl-alanine methyl ester (APM), L-aspartylglycine and L-aspartyl-L-alanine. Also contemplated are other peptides, especially oligopeptides such as di- and tri-peptides of the acidic amino acids, i.e., aspartic acid and glutamic acid, with nonbasic amino acids such as alanine, ceptine, tyrosine, phenyl alanine, glycine, leucine, isoleucine, proline, methionine, valine, threonine, tryptophan and the like. Specifically suggested of this group are L-tyrosyl-L-glutamic acid, L-tyrosyl-L-aspartic acid, L-alanyl-L-glutamic acid and L-alanyl-L-aspartic acid.

The chemical reactivity of the dipeptide sweetener differs significantly from sweeteners such as sucrose, fructose, saccharin, cyclamates or the like. Therefore, in addition to acidulent and colorant, sodium chloride and a hydrophilic material such as tapioca dextrin may be advantageously blended into the dipeptide-containing dry mix. Sodium chloride is used at a level of from 0.5–2.0 weight percent of the dry ingredients. The hydrophilic material is used in the range of from 15 to 30 weight percent of total dry ingredients.

The hydrophilic material functions as a melting point elevator. A melting point elevator, for this invention, is defined as any edible material which functions to raise the melting point of the tabletable mixture so that the tablet will not soften, melt or form a hard core during the drying step that follows tablet formation. Preferred melting point elevators are hydrophilic materials such as tapioca dextrin. Suitable substitutes for dextrin are acid-stable hydrophilic materials such as larch gum, xanthan gum, pectin, pregelatinized starch, gelatin, gelatin derivatives and combinations thereof.

In summary, the dry mix of this invention usually comprises an acidulent, a colorant, a dipeptide sweetener, a calcium phosphate, a hydrophilic material and sodium chloride.

The chemical reactivity of the dipeptide sweetener also requires the judicious selection of an aqueous moistener. The moistener supplies water and water-binders when forming the tabletable mix. As employed herein, the term "aqueous moistener" is used interchangeably with and is meant to include a liquid solution having three constituents: water, an alcohol or glycol and glycerine. Propylene glycol is preferred; however, lower alkyl ($C_1$–$C_4$) glycols and lower alkyl ($C_1$–$C_3$) alcohols may be substituted for propylene glycol. Ethanol is a preferred alcohol. Other suitable glycerine derivatives are mono-, di- and tri-glycerides, diglyceryl tetra oleate and the like. The combination of glycerine and propylene glycol is believed to contribute to the preparation of a non-friable, structurally-strong tablet. Moreover, as a necessary element to the "moistener", monocalcium phosphate must be added to the formulation.

The aqueous moistener disclosed adequately satisfies the fluid demand of the dipeptide sweetener. Fluid demand is characterized in quantitative terms as the minimum amount of fluid that must be added to a dry system (powder) in order to obtain a uniform, continuous, moistened mix. If there are lumps of moist material after thorough mixing, a sufficient quantity of fluid has not been added. If an excessive amount of fluid is added to the dry mix, a uniform, continuous mix can be formed; however, insoluble tablets having low melting temperatures result. It is observed that a fluid demand of greater than 3.5% water by weight of dry ingredients causes the formation of a hard, slowly-soluble core in a dipeptide-sweetened beverage tablet when dissolved in water. It was indeed surprising and unexpected to find that the amount of water needed to prepare a rapidly-soluble dipeptide-containing beverage tablet could be maintained at an appropriate level with an aqueous moistener composed of glycerine, water and propylene glycol. When using the process of this invention, the resulting tablet dissolves rapidly in cold (3° C.) water without the formation of a hard, slowly-soluble core.

The aqueous moistener is typically added to the dry mix in an amount which is from about 5% to 15% of the weight of the dry mix. Glycerine to water weight ratios of 1.6 to 4.0 parts glycerine to 1.0 part water are used. Propylene glycol to water weight ratios are about 1.0 part propylene glycol to about 1.0 part water.

Admixing the dry mix with the aqueous moistener results in the formation of a cohesive powder. As stated hereinabove, mono-calcium phosphate is added to the aqueous moistener as a vehicle for introducing it into the dry mix. The moistener is uniformly dispersed throughout the dry mix and mixing is continued until the ingredients have a smooth, uniform texture.

A disintegrant such as tricalcium phosphate is added to the smooth, moist mixture above and mixed until uniformly dispersed. The resulting mixture is allowed to rest in a sealed container for several minutes, preferably 15-30 minutes. The rest period is desired to allow the ingredients to form a softset, cohesive mass which can be broken up with a spoon to yield a low bulk density powder. The low bulk density powder is ready for tableting and is referred to herein as a tabletable mixture.

The tabletable mixture is then compressed into coherent tablets of the desired size having a tablet density, after drying, of from about 0.5 to about 1.0 grams per cubic centimeter (g/cc). The desired degree of compression is determined by the volume occupied by a pre-determined weight of material to obtain desired density. Final tablet density is one of the critical parameters of this invention. If the dry tablet density is below 0.5 g/cc, the structural strength of the tablet is less than what is commercially desired. If the dry tablet density exceeds 1.0 g/cc, the solubility in water is greatly reduced. Thus, the optimum tablet density, after drying, is between 0.5 to 1.0 g/cc.

The final tablet will appear to be essentially free of voids much larger than the normal interstitial distances obtained by compressing the mixture. The use of the aqueous moistener in combination with tapioca dextrin, according to the process, enables the virtual elimination of the larger sized voids while not causing such a high degree of compaction that the solubility of the resulting tablet will be unduly decreased. Preferably, the tablets according to the present invention, will totally disintegrate in less than about 20, most preferably 10, seconds in water containing ice at 3° C. Complete dissolution of the composition will normally take place within about one minute under moderate agitation.

While the degree of compression is determined by the final density required and not by pressure, it has been found that pressures of from about 0.25 to about 60 psig (0.02–4.2 Kg/cm$^2$) are typically employed. The glycerine aids in permitting the formation of a uniform, large, void-free final product and is further believed to provide a desirable degree of toughness in the final product because it does not volatilize upon the final drying step. Drying and cooling are, however, essential, and the tablets should be dried to a stable moisture content, preferably below about 1%. This can be accomplished at any temperature not significantly in excess of, and preferably below 55° C. that is effective to achieve drying within a reasonable period of time, e.g., less than 24 hours. Typically, drying can be accomplished at a temperature of around 55° C. for a period of about 15 to 30 minutes. Any other non-degrading conditions of time and temperature can also be employed. The drying step is also a heating/cooling step which converts the soft tablet into a strong, tough tablet. The process is analagous to a heat set.

For certain product applications, it is desired to provide a glazed surface on the tablet. This glaze can be prepared to seal the surface of the tablet and prevent minor amounts of beverage forming material from being easily removed. It is important to prevent this crumbling because of the high concentration of flavor and coloring materials which if removed from the tablet and accumulated on a counter top or table cloth will result in not only a significant loss of beverage concentrate, but also may create an unsightly situation and an immediate need for cleaning. This could be a cause for great inconvenience in a product intended for convenience use. To obtain this glazed coating, a tablet as prepared above is contacted with steam or an otherwise moist atmosphere which will cause surface wetting of the tablet. This wetted surface is then dried to achieve the final glaze. In one particular embodiment, a saturated water vapor from water boiling at atmospheric pressure and 100° C. is brought into contact with the beverage tablets for from about 2 to about 10 seconds to result in a glaze due to a pickup of moisture on the order of from about 3.5 to about 5% by weight. The resulting product is then dried under normal conditions to achieve the glazed effect.

The following example is presented for the purpose of further illustrating and explaining the present invention and are not to be taken as limiting in any regard. Unless otherwise indicated, all parts and percentages are by weight.

EXAMPLE

According to this example, an attractive, cherry-flavored, sweetened beverage mix tablet is prepared from the following ingredients:

| Ingredient | Parts by Weight |
| --- | --- |
| Citric acid - Miles fine grind | 8 |
| Premix* | 8 |
| Pectin | 4 |
| L-aspartyl-L-phenyl-alanine methyl ester (APM) | 2.8 |
| Sodium chloride (powdered) | 0.6 (optional) |
| Tapioca dextrin | 6 |
| Aqueous moistener** | 16 |
| Tricalcium phosphate | 3 |

*Premix: Citric acid, 69 parts; cherry flavor, 11 parts; FD & C Red #40, 10 parts; Vitamin C, 4 parts.
**Aqueous moistener: 2 parts monocalcium orthophosphate (MCP); 0.6 parts of a fluid composed of 6 parts glycerine, 2 parts propylene glycol and 2 parts water.

The first four ingredients listed above are premixed thoroughly using a mortar and pestle. This mixture is then placed in a 400 ml beaker and mixed with the specified amount of sodium chloride and dextrin using a teaspoon. The aqueous moistener is added and mixed with a spoon until the mixture is uniform and smooth in texture. At this point, 1 part of tricalcium phosphate is added and mixed with a spoon until uniformly dispersed. The resulting mixture is allowed to rest for a period of about 15 minutes in a sealed container. The mixture soft sets during this period of time and when broken up with a spoon yields a cohesive powder of very low density. The bulk density of the resulting material is less than 0.5 grams per cubic centimeter. About 8.5 grams of this low bulk density powder is placed into a 3.8 centimeter diameter die. After leveling, a top punch is put in place and the mix is pressed to a thickness of 11 millimeters using a pressure of about 0.25 to 1.0 psig (0.01–0.07 Kg/cm$^2$). The resulting tablet is removed from the die and heated at 55° C. for 15 minutes to reduce the moisture content to less than 1%. After cooling to room temperature, the tablet density is measured and found to be about 0.5 grams per cubic centimeter. The resulting tablet is noncrumbly, tough and resembles hardened taffy. Packaging in bubble-pack materials is recommended. Preferably, the clear plastic bubble portion will be prepared from a suitable plastic polymer and the backing will be prepared with moisture barrier materials.

When placed in a pitcher containing two quarts of water and ice, the product of this example disintegrates and dissolves in about one minute with moderate stirring.

The above description is for the purpose of teaching the person skilled in the art how to practice the present invention. This description is not intended to detail all of the obvious modifications and variations of the invention which will become apparent to the skilled worker upon reading. However, applicant does intend to include all such obvious modifications and variations within the scope of this invention which is defined by the following claims.

What is claimed is:

1. An improved process for preparing a nonfriable, tableted beverage mix comprising a dipeptide sweetener, colorant, flavor and edible acidulent by compressing a moistened mixture of these components comprising the steps of:
    (a) preparing a uniform dry mix comprising a dipeptide sweetener, an acidulent, a hydrophilic material and a colorant;
    (b) admixing with the dry mix a moistener consisting of water, propylene glycol or ethyl alcohol, monocalcium phosphate, and glycerine or a glycerine derivative;
    (c) adding a sufficient amount of a disintegrant to convert the mixture of step (b) into a tabletable mixture;
    (d) compressing the tabletable mixture to the extent necessary to obtain a coherent tablet which has a tablet density, after drying, of from 0.5 to 1.0 grams per cubic centimeter; and, thereafter,
    (e) drying the tablet to a stable moisture content of less than about 1% by weight.

2. The process of claim 1 wherein the tablet is exposed to wet steam for a period of time effective to moisten the surface and provide a glazed surface upon drying.

3. An improved process accoring to claim 1 wherein the uniform, dry mix comprises an acidulent, a colorant, dipeptide sweetener, sodium chloride and a dextrin, all in dry particulate form.

4. The process of claim 1 wherein the moistener consists of glycerine, propylene glycol, monocalcium phosphate and water.

5. The process of claim 4 wherein the monocalcium phosphate is added in an amount which is from 5 to 15 weight percent of the uniform dry mix.

6. The process of claim 5 wherein the amount of glycerine-to-water weight ratio is from 1.6 to 4.0 parts glycerine to 1.0 part water.

7. The process of claim 1 wherein the dipeptide sweetener is L-aspartyl-L-phenylalanine methyl ester.

8. The process of claim 1 wherein the disintegrant is tricalcium phosphate.

9. A product produced according to the process of claim 1.

* * * * *